US012615009B2

(12) United States Patent
Hu et al.

(10) Patent No.: US 12,615,009 B2
(45) Date of Patent: *Apr. 28, 2026

(54) SOLAR ENERGY UTILIZATION APPARATUS

(71) Applicant: BOLY MEDIA COMMUNICATIONS (SHENZHEN) CO., LTD., Shenzhen (CN)

(72) Inventors: Xiaoping Hu, Shenzhen (CN); Guoluan Jiang, Shenzhen (CN)

(73) Assignee: BOLY MEDIA COMMUNICATIONS (SHENZHEN) CO., LTD., Shenzhen (CN)

( * ) Notice: Subject to any disclaimer, the term of this patent is extended or adjusted under 35 U.S.C. 154(b) by 61 days.

This patent is subject to a terminal disclaimer.

(21) Appl. No.: 18/283,446

(22) PCT Filed: Apr. 1, 2021

(86) PCT No.: PCT/CN2021/085104
§ 371 (c)(1),
(2) Date: Sep. 21, 2023

(87) PCT Pub. No.: WO2022/205375
PCT Pub. Date: Oct. 6, 2022

(65) Prior Publication Data
US 2024/0178788 A1 May 30, 2024

(51) Int. Cl.
*H02S 40/22* (2014.01)
*F24S 23/71* (2018.01)
*H02S 40/42* (2014.01)

(52) U.S. Cl.
CPC .............. *H02S 40/22* (2014.12); *F24S 23/71* (2018.05); *H02S 40/425* (2014.12)

(58) Field of Classification Search
CPC ......... H02S 40/22; H02S 40/425; F24S 23/71
See application file for complete search history.

(56) References Cited

U.S. PATENT DOCUMENTS

| | | | |
|---|---|---|---|
| 2001/0006066 A1* | 7/2001 | Cherney | ................. F03G 6/001 |
| | | | 136/243 |
| 2010/0132753 A1* | 6/2010 | Rosa | ....................... F24S 23/80 |
| | | | 136/246 |
| 2010/0147360 A1* | 6/2010 | Morse | ................... H10F 77/484 |
| | | | 136/246 |
| 2021/0265518 A1* | 8/2021 | Temple | ................... F24S 23/70 |

* cited by examiner

*Primary Examiner* — Devina Pillay

(57) ABSTRACT

Disclosed is a solar energy utilization apparatus, comprising a liquid light-condensing unit (100), a light energy utilization unit (200) and a reflection groove (300), wherein the light energy utilization unit (200) has a first light energy utilization part (210) and a second light energy utilization part (220), and the liquid light-condensing unit (100) has a light-receiving surface larger than the width of the first light energy utilization part (210) and/or the second light energy utilization part (220), and can receive more sunlight. The liquid light-condensing unit (100) is filled with a transparent liquid (130), and sunlight can be transmitted through a transparent wall of the liquid light-condensing unit (100) and into the transparent liquid (130), and then form a total reflection phenomenon.

9 Claims, 2 Drawing Sheets

SOLAR ENERGY UTILIZATION APPARATUS

TECHNICAL FIELD

The present disclosure relates to light energy conversion utilization devices.

BACKGROUND

Solar energy systems are increasingly used with the reduction of the cost of photovoltaic panels and the increase of efficiency. However, some current low-power light-concentrating solar devices typically do not equip with liquid cooling, resulting in higher operating temperatures and loss of efficiency. Others, although using liquid cooling, fail to take advantage of the optical properties of liquids.

SUMMARY

A new type of solar energy utilization apparatus provided in the present disclosure to demonstrate a new solar energy utilization structure.

Based on the above object, a solar energy utilization apparatus provided in an embodiment of the present disclosure may include:

a light energy utilization unit having a first light energy utilization part and a second light energy utilization part that are capable of receiving, converting and utilizing solar light, the first light energy utilization part and the second light energy utilization part being arranged back to back;

a liquid light-condensing unit in an axially symmetric structure or a rotating structure, the liquid light-condensing unit having an accommodating cavity filled with a transparent liquid and provided with at least one transparent wall, the at least one transparent wall being a light receiving surface for receiving sunlight from outside, the light energy utilization unit being arranged in the accommodating cavity, outside the accommodating cavity or forming a wall of the accommodating cavity, the width of the light receiving surface being greater than the width of the first light energy utilization part and/or the second light energy utilization part; and a reflection groove with a reflecting surface arranged on an inner wall thereof, the liquid light-condensing unit being arranged in the reflection groove, the second light energy utilization part being arranged towards the reflecting surface, such that a part of the sunlight is allowed to be transmitted from the liquid light-condensing unit onto the reflecting surface and, by means of the reflecting surface, reflected back into the liquid light-condensing unit or reflected onto the light energy utilization unit, and a part of the sunlight in the accommodating cavity transmitted from the transparent liquid to the transparent wall forms a total reflection phenomenon so as to concentrate the sunlight onto the light energy utilization unit.

In an embodiment, the light energy utilization unit may be arranged in the accommodating cavity; and there may be a gap between the first light energy utilization part and the wall, as well as between the second light energy utilization part and the wall, to accommodate the transparent liquid that guides the sunlight to the first light energy utilization part and the second light energy utilization part.

In an embodiment, the transparent wall may include a transparent top wall and a transparent bottom wall; the light energy utilization unit may be arranged in the accommodating cavity, the first light energy utilization part may be arranged at the inner side of the transparent top wall for receiving sunlight transmitted from the transparent top wall, and the transparent liquid may be arranged between the second light energy utilization part and the transparent bottom wall for guiding the sunlight onto the second light energy utilization part.

In an embodiment, the transparent wall may include a transparent top wall and a transparent bottom wall, the first light energy utilization part may be arranged at the outer side of the transparent bottom wall, the transparent liquid may guide sunlight to the first light energy utilization part, and the reflecting surface may be capable of reflecting at least part of the sunlight onto the second light energy utilization part.

In an embodiment, the transparent top wall or the transparent bottom wall may be a flat surface, a curved surface, a folded surface or a Fresnel lens tooth surface.

In an embodiment, the transparent bottom wall may be in a V-shaped structure or an inverted V-shaped structure.

In an embodiment, the reflecting surface may be arranged separately from the transparent bottom wall.

In an embodiment, a portion of the transparent bottom wall may be overlapped with a portion of the reflecting surface.

In an embodiment, the transparent bottom wall may be in a V-shaped structure or an inverted V-shaped structure, and the bottom of the reflection groove may be overlapped with the V-shaped structure or the inverted V-shaped structure.

In an embodiment, at least a portion of the reflecting surface may be a reflective Fresnel lens.

In an embodiment, the bottom of the reflection groove may have a light reflecting structure protruding towards the liquid light-condensing unit.

In an embodiment, the apparatus may further include a closed container; the light energy utilization unit and the liquid light-condensing unit are arranged in the closed container, the closed container may have a transparent surface so that the sunlight can be transmitted from the transparent surface into the liquid light-condensing unit, the closed container may be provided with a working medium in contact with the light energy utilization unit; and the closed container may have a first external interface for the working medium to enter and exit the closed container to utilize the working medium.

In an embodiment, the apparatus may further include a mounting member coupled with the liquid light-condensing unit and/or the reflection groove and configured to connect the solar energy utilization apparatus with another adjacent solar energy utilization apparatus.

According to the solar energy utilization apparatus provided in the above embodiments and comprising the light energy utilization unit, the liquid light-condensing unit and the reflection groove, the light receiving surface is greater than the width of the first light energy utilization part and/or the second light energy utilization part so as to receive more sunlight; the liquid light-condensing unit is filled with a transparent liquid so that the sunlight is allowed to transmit from the transparent wall of the liquid light-condensing unit into the transparent liquid to form a total reflection phenomenon; and the reflection groove capable of reflecting the sunlight transmitted from the liquid light-condensing unit back into the liquid light-condensing unit or onto the light energy utilization unit, together with the total reflection phenomenon, can enable more sunlight to concentrate on the light energy utilization unit to improve concentration efficiency. Meanwhile, the axially symmetric structure or the rotating structure of the liquid light-condensing unit can adapt to larger angle deflection of sunlight or expanded area of the light receiving surface, thereby improving the focusing ratio or adapting to the deflection of sunlight in the east-west direction.

DETAILED DESCRIPTION

Figure 1:
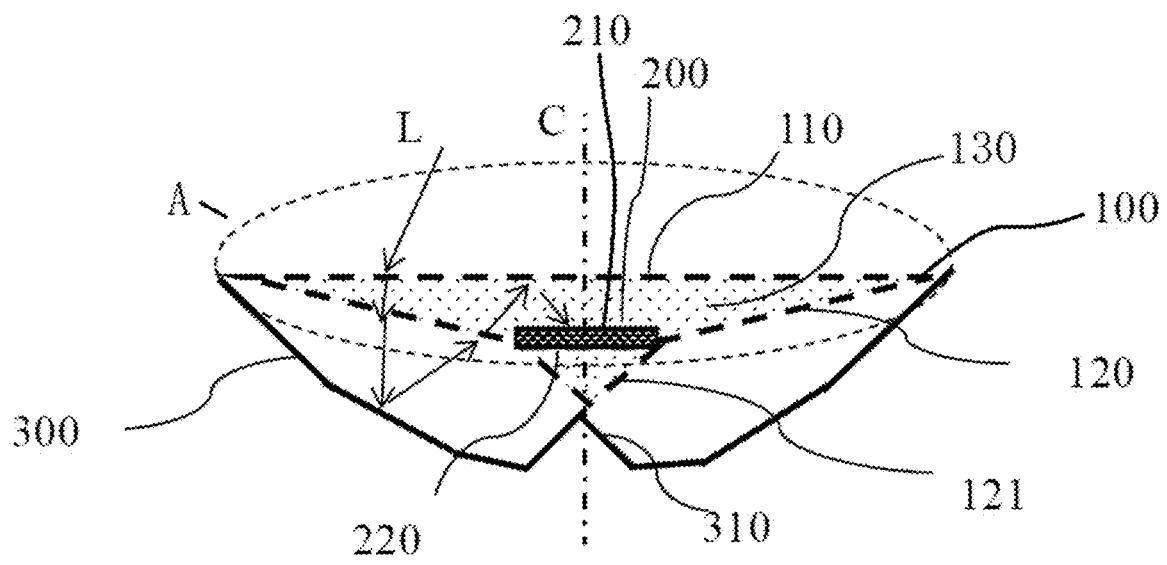
FIG. 1 is a schematically cross-sectional diagram of a solar energy utilization apparatus according to Example 1 of the present disclosure.

The present disclosure will be further described in detail below through specific embodiments with reference to the accompanying drawings. Common or similar elements are referenced with like or identical reference numerals in different embodiments. Many details described in the following embodiments are for better understanding the present disclosure. However, those skilled in the art can realize with minimal effort that some of these features can be omitted in different cases or be replaced by other elements, materials and methods. For clarity some operations related to the present disclosure are not shown or illustrated herein so as to prevent the core from being overwhelmed by excessive descriptions. For those skilled in the art, such operations are not necessary to be explained in detail, and they can fully understand the related operations according to the description in the specification and the general technical knowledge in the art.

In addition, the features, operations or characteristics described in the specification may be combined in any suitable manner to form various embodiments. At the same time, the steps or actions in the described method can also be sequentially changed or adjusted in a manner that can be apparent to those skilled in the art. Therefore, the various sequences in the specification and the drawings are only for the purpose of describing a particular embodiment, and are not intended to be an order of necessity, unless otherwise stated one of the sequences must be followed.

The serial numbers of components herein, such as "first", "second", etc., are only used to distinguish the described objects and do not have any order or technical meaning. The terms "connected", "coupled" and the like here include direct and indirect connections (coupling) unless otherwise specified.

A solar energy utilization apparatus provided in an embodiment of the present disclosure can be configured for receiving and utilizing sunlight for energy conversion, converting the sunlight into electrical, thermal and other forms of energy for use.

The solar energy utilization apparatus may include at least a light energy utilization unit, at least a liquid light-condensing unit, and a reflection groove. The light energy utilization unit may have a first light energy utilization part and a second light energy utilization part that are capable of receiving, converting and utilizing sunlight. The first light energy utilization part and the second light energy utilization part may be arranged back to back. In an embodiment, the first light energy utilization part and the second light energy utilization part may be one or more of photovoltaic panels, photothermal utilization devices, photoelectric and thermal energy utilization devices, concentrated light energy utilization units. The photovoltaic panels may generally refer to any device that directly converts light energy into electric energy, including various semiconductor photovoltaic panels, photovoltaic thin films, quantum dot optoelectronic converter devices, etc. In other embodiments, the first and second light energy utilization parts may also be in other forms of solar light utilization conversion structures.

The liquid light-condensing unit may have several walls forming an accommodating cavity filled with a transparent liquid. The light energy utilization unit may be arranged in the accommodating cavity, outside the accommodating cavity, or formed as a wall of the accommodating cavity. At least some of the walls may be a transparent wall, for example, they may all be transparent wall. The transparent wall may be designed as the bottom wall, side wall, or top wall of the accommodating cavity according to actual needs. The transparent wall may all be made of a transparent material, and sunlight can be transmitted from the transparent wall(s) to the transparent liquid. At least a transparent wall may be a light receiving surface for receiving sunlight transmitted from the outside. The top wall usually serves as the light receiving surface, but it is obvious that the light receiving surface is not limited to the top wall.

The structure of the liquid light-condensing unit may be configured as: part of the sunlight transmitted from the transparent liquid to the transparent wall forming a total reflection (also known as total internal reflection) phenomenon. That is, the sunlight reflected to the transparent liquid may, under the total reflection effect, continue to propagate within the liquid light-condensing unit and finally converge onto the first light energy utilization part and/or the second light energy utilization part. The transparent wall(s) that can form the total reflection phenomenon may be different depending on the various locations of the first light energy utilization part and/or the second light energy utilization part.

The inner wall of the reflection groove may have a reflecting surface for reflecting sunlight to the first light energy utilization part and/or the second light energy utilization part. The liquid light-condensing unit may be arranged in the reflection groove. In an embodiment, the second light energy utilization part may be arranged towards the reflecting surface. A part of the sunlight may be allowed to be transmitted from the liquid light-condensing unit onto the reflecting surface, and, by means of the reflecting surface, be reflected back into the liquid light-condensing unit or onto the second light energy utilization part. At least part of the sunlight that reflected back to the liquid light-condensing unit may be converged to the first light energy utilization part and/or the second light energy utilization part under the total reflection.

In the embodiment, the light receiving surface of the liquid light-condensing unit may be larger than the width of the first light energy utilization part and/or the second light energy utilization part so that more sunlight can be received. The sunlight can be transmitted from the transparent wall of the liquid light-condensing unit to the transparent liquid, forming the total reflection phenomenon. The reflection groove can also reflect the sunlight transmitted from the liquid light-condensing unit back into the liquid light-condensing unit or onto the light energy utilization unit. Under the combined effect of the total reflection phenomenon and the reflection groove, more sunlight can be concentrated onto the light energy utilization unit. To better utilize the sunlight, a structure with two relatively arranged light receiving surfaces (the first light energy utilization part and/or the second light energy utilization part) may be adopted in this embodiment, such that the sunlight may be absorbed from two back-to-back directions (e.g. facing the sun and facing away from the sun), improving the concentration efficiency.

Meanwhile, the liquid light-condensing unit is in an axially symmetric structure (including one or two symmetry axes) or a rotating structure. The so-called axial symmetry may refer to a cross-section cut along a plane perpendicular to an axis with similar shapes and the same or different sizes. In an embodiment, the axially symmetric structure may be a uniaxisymmetric structure with a symmetrical axis. Alternatively, it may be a biaxially symmetric structure with two or more symmetry axes; that is, the liquid light-condensing unit may be cut along two or more planes located in different directions and not parallel to each other, and the cross sections obtained respectively form an axisymmetric structure in different directions. For example, a cube structure can be cut from multiple different directions to obtain different cross sections which are axially symmetric. The so-called rotating structure may refer to a structure around a centerline by a curved surface, a folded surface, a combination of curved surface and folded surface, etc., the structure comprising a rotating three-dimensional structure formed by rotating around a centerline and an approximate structure formed by replacing the curved surface in the rotating three-dimensional structure with a folded surface or a combination of curved surface and curved surface. In the rotating structure, its outer walls are set around the center. Specifically, in the rotating three-dimensional structure, an identical cross section is obtained by cutting through any plane passing through a rotating centerline, the cross section being symmetrical about the rotating centerline. In some other structures that are similar to the rotating three-dimensional structure, it may not be possible to ensure that the same and symmetrical cross-section is obtained by cutting through each plane passing through the centerline due to the use of a folded surface instead of the curved surface for the rotating body, but the cross-section obtained by cutting through some planes passing through the centerline from a few specific angles may also be the same and symmetrical shape. The axially symmetric structure or the rotating structure can adapt to larger angle deflection of sunlight or expanded area of the light receiving surface, thereby improving the focusing ratio or adapting to the deflection of sunlight in the east-west direction.

In an embodiment, the transparent liquid may be pure water (water), antifreeze liquid (a mixture of water and ethylene glycol), or other environmentally friendly transparent liquid (such as a mixture of water and glycerol). Furthermore, the transparent liquid may directly or indirectly form a heat transfer structure with the first light energy utilization part and the second light energy utilization part, thereby cooling or absorbing the first light energy utilization part and improving the utilization of light energy.

Further, the light energy utilization unit may be arranged in the accommodating cavity, outside the accommodating cavity, or formed as a wall of the accommodating cavity. In an embodiment, the light energy utilization unit may be arranged in the accommodating cavity; and there may be a gap between the first light energy utilization part and the wall, as well as between the second light energy utilization part and the wall, to receive the transparent liquid which guides the sunlight onto the first light energy utilization part and the second light energy utilization part.

In an embodiment, the transparent wall may include a transparent top wall and a transparent bottom wall. The light energy utilization unit may be arranged on the wall of the accommodating cavity, wherein the first light energy utilization part may be attached to the inner or outer side of the transparent top wall for the incident sunlight from the transparent top wall, and a transparent liquid may be arranged between the second light energy utilization part and the transparent bottom wall for guiding the sunlight onto the second light energy utilization part.

In another embodiment, the transparent wall may include a transparent top wall and a transparent bottom wall, the first light energy utilization part may be arranged on the outer or inner side of the transparent bottom wall, the transparent liquid may guide the sunlight to the first light energy utilization part, and the reflecting surface can guide some sunlight onto the second light energy utilization part.

Based on the above inventive concept, several different embodiments are further described below to better illustrate the inventive concept.

Example 1

Referring to FIG. 1, a solar energy utilization apparatus disclosed in this embodiment may include a liquid light-condensing unit 100, a light energy utilization unit 200 and a reflection groove 300. The liquid light-condensing unit 100 may be a closed structure with a closed accommodating cavity filled with a transparent liquid 130. The accommodating cavity may have a transparent top wall 110 and a transparent bottom wall 120. The light energy utilization unit 200 may be immersed in the transparent liquid, and may have a first light energy utilization part 210 facing upwards and a second light energy utilization part 220 facing downwards that can receive, convert and utilize sunlight. There may be a gap between the first light energy utilization part 210 and the wall of the accommodating cavity, as well as between the second light energy utilization part 220 and the wall, for receiving the transparent liquid 130 which may guide sunlight onto the first light energy utilization part 210 and the second light energy utilization part 220. The liquid light-condensing unit 100 and the light energy utilization unit 200 may be arranged in the reflection groove 300 that have a reflecting surface.

Of course, in other embodiments, the light energy utilization unit 200 may be arranged on the inner or outer surface of the transparent top wall 110 or the transparent bottom wall 120 of the liquid light-condensing unit 100.

FIG. 1 shows the process of a part of incident sunlight L refracted by the liquid light-condensing unit 100, reflected by the reflection groove 300, then refracted by the liquid light-condensing unit 100 and fully reflected to the light energy utilization unit 200. The other part of the sunlight not shown may also be directly transmitted and/or fully reflected from the liquid light-condensing unit 100 to the first light energy utilization part 210, without being reflected by the reflection groove 300. That is, by fully utilizing the total reflection phenomenon of the transparent liquid 130 in the liquid light-condensing unit 100 and the reflection effect of the reflection groove 300, collection and focusing of the sunlight can be achieved from a larger angle.

In an embodiment, at least some of the reflecting surface of the reflection groove 300 is a reflective Fresnel lens or other form of reflective structure.

In an embodiment, the transparent liquid 130 may also be used to cool or absorb heat for the light energy utilization unit 200 so as to improve the utilization efficiency of light energy for the light energy utilization unit 200. That is to say, some transparent side walls (such as the transparent top wall 110) have two functions at the same time: transmitting incident light from the outside through a surface first, and then fully reflecting light from the transparent liquid 130 through one surface. In other embodiments, the transparent bottom wall 120 (at least a portion thereof) may also have functions of transmission and total reflection.

Referring to FIG. 1, in this embodiment, the liquid light-condensing unit 100 is a rotating structure, specifically a rotating three-dimensional structure, with C as its rotating centerline. FIG. 1 shows the cross section of the liquid light-condensing unit 100 after cutting along a vertical plane passing through the rotating centerline C, while the shape of the liquid light-condensing unit 100 in the three-dimensional space should be formed by the cross section rotating around the rotating centerline C along a direction shown by the dotted line in FIG. 1. Considering the perspective relationship in FIG. 1, the dotted line is shown as an oval, but in fact, the trajectory of the cross section rotating around the rotating centerline C should be circular. The cross-section shown in FIG. 1 is a pentagonal folded surface, with the transparent bottom wall 120 connected by four folded surfaces. In other embodiments, the wall of the liquid light-condensing unit 100 may be a curved surface or a Fresnel lens tooth surface. For example, the transparent top wall 110 or the transparent bottom wall 120 may be a flat surface, a curved surface, a folded surface or a Fresnel lens tooth surface. The cross section of the liquid light-condensing unit 100 may also be other shapes such as tetrahedral and heptahedral.

Please continue to refer to FIG. 1. In this embodiment, the transparent bottom wall 120 may have a V-shaped structure 121 (or an inverted V-shaped structure) to increase the depth of the transparent bottom wall 120 in the vertical direction. The bottom of the reflection groove 300 may also have a light reflecting structure 310 that protrudes towards the liquid light-condensing unit 100, such as the light reflecting structure 310 in an inverted V-shaped convex form shown in FIG. 1, which is arranged oppositely to the V-shaped structure 121 of the transparent bottom wall 120, such that more sunlight can be reflected onto the second light energy utilization part 220 to improve the utilization of sunlight by the second light energy utilization part 220, thus improving the overall efficiency of the light energy utilization unit.

In an embodiment, the reflecting surface may be separate from the transparent bottom wall 120 without contact with each other. Alternatively, a portion of the transparent bottom wall 120 may be in contact with or overlapped with the reflecting surface to achieve better heat dissipation. This contact may be point contact, line contact, or surface contact; and the overlap may also make the two an integrated structure. For example, the bottom of the reflection groove 300 may be in contact with or coincide with the V-shaped structure 121 or the inverted V-shaped structure.

Example 2

Figure 2:
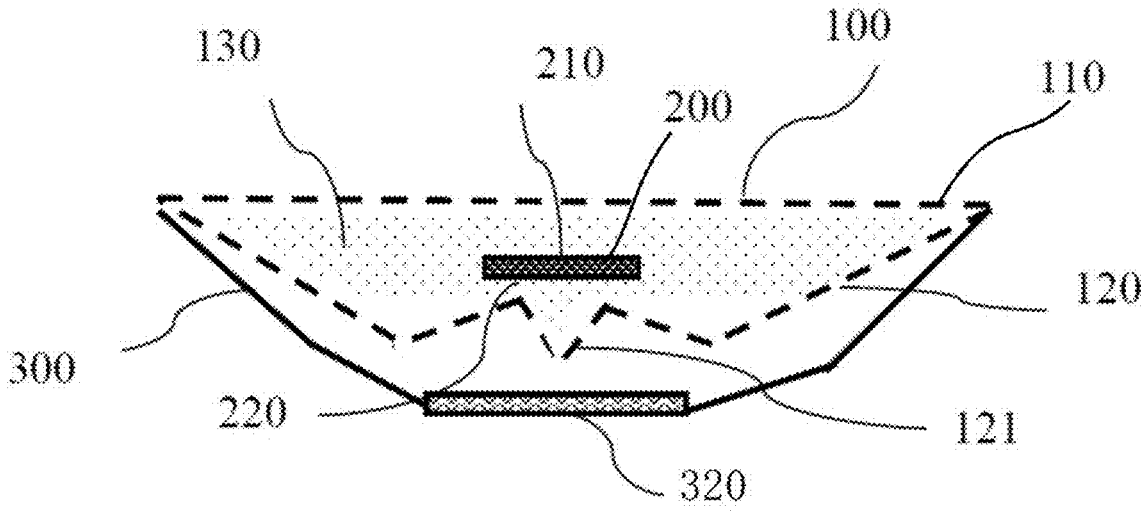
FIG. 2 is a schematically cross-sectional diagram of a solar energy utilization apparatus according to Example 2 of the present disclosure.

Referring to FIG. 2, a solar energy utilization apparatus disclosed in this embodiment may include a liquid light-condensing unit 100, a light energy utilization unit 200 and a reflection groove 300. FIG. 2 shows the cross section of the solar energy utilization apparatus, wherein the liquid light-condensing unit 100 and the reflection groove 300 are both uniaxial symmetric strip structures, with the cross section thereof being axially symmetric.

The difference between the solar energy utilization apparatus shown in this embodiment and Example 1 is that the transparent bottom wall 120 in this embodiment consists of six flat surfaces. The transparent bottom wall 120 may also have a V-shaped structure 121 (or an inverted V-shaped structure) to increase the depth of the transparent bottom wall 120 in the vertical direction. However, the difference is that in this embodiment, the middle portion of the reflection groove 300 is a linear reflective Fresnel lens. The reflecting surface of the reflection groove 300 (such as the linear reflective Fresnel lens 320 at the bottom) is separated from the transparent bottom wall 120, allowing for more reflective paths for sunlight.

Example 3

Figure 3:
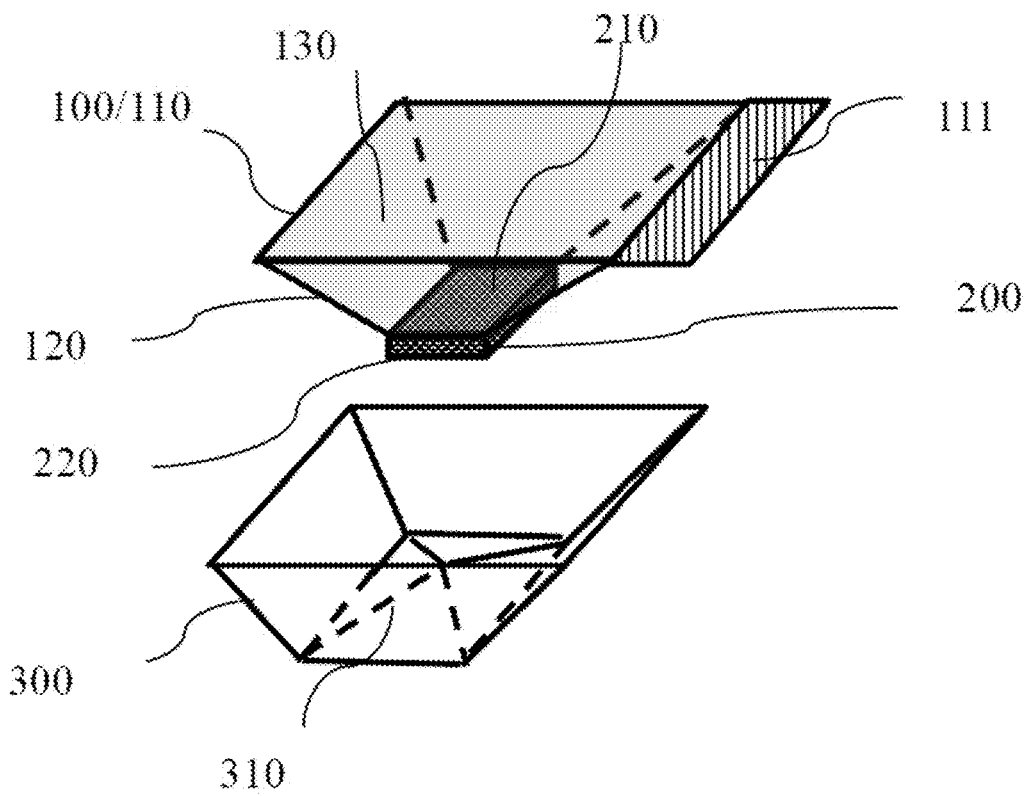
FIG. 3 is a schematically cross-sectional diagram of a solar energy utilization apparatus according to Example 3 of the present disclosure.

Referring to FIG. 3, a solar energy utilization apparatus disclosed in this embodiment may include a liquid light-condensing unit 100, a light energy utilization unit 200 and a reflection groove 300. The liquid light-condensing unit 100 and the reflection groove 300 in this embodiment may be both biaxially symmetrical structures with two symmetrical axes. An axisymmetric cross section may be obtained by cutting the biaxially symmetric structure in two different directions. FIG. 3 shows a three-dimensional structure diagram of the apparatus in separation, in which the liquid light-condensing unit 100 may specifically be in the shape of an inverted quadrilateral pyramid. This embodiment is suitable for use with a sun-tracking system.

The main difference between this embodiment and Example 1 is that, the transparent wall includes a transparent top wall 110 and a transparent bottom wall 120, and the first light energy utilization part 210 is arranged at the outer side of the transparent bottom wall 120. For example, the middle portion of the bottom surface of the liquid light-condensing unit 100 is flat; and the light energy utilization unit 200 is arranged below the flat portion. The transparent liquid 130 may guide sunlight to the first light energy utilization part 210; and the reflecting surface can reflect at least a part of the sunlight onto the second light energy utilization part 220.

In an embodiment, the raised light reflecting structure 310 on the reflection groove 300 may be in point, line, or surface contact with the transparent bottom wall 120 to achieve better heat dissipation.

Furthermore, a mounting member connected with the liquid light-condensing unit 100 and/or the reflection groove 300 may also be included in this embodiment. The mounting member may be used for connecting the solar energy utilization apparatus with other devices. Referring to FIG. 3, in a more specific embodiment, the mounting member is a transparent hanger 111 for mounting the solar energy utilization apparatus. For example, the entire solar energy utilization apparatus may be hung on another object or another solar energy utilization apparatus via the hanger 111.

Example 4

Figure 4:
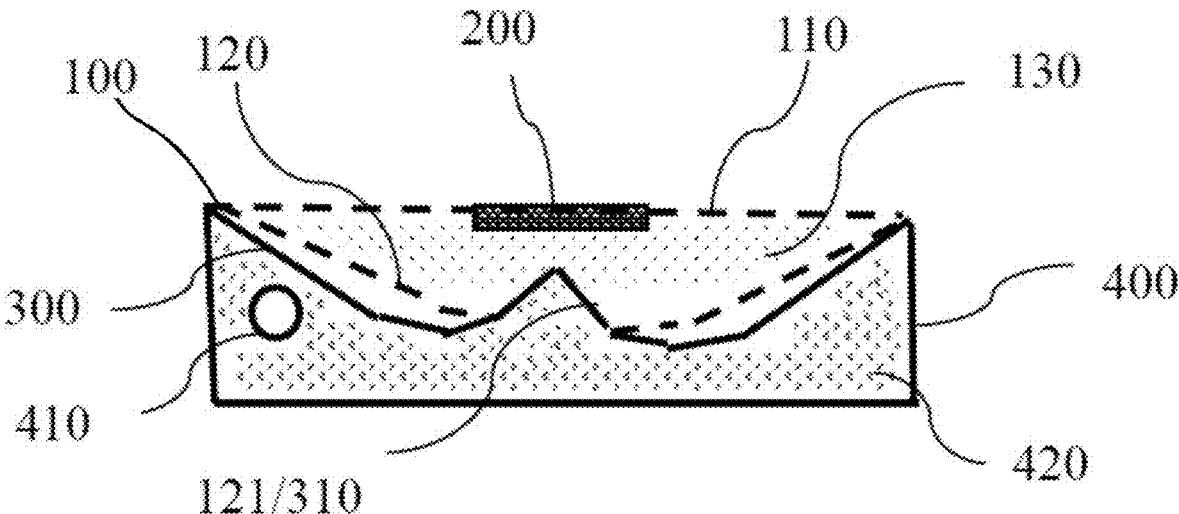
FIG. 4 is a schematically cross-sectional diagram of a solar energy utilization apparatus according to Example 4 of the present disclosure.

Referring to FIG. 4, a solar energy utilization apparatus disclosed in this embodiment may include a liquid light-condensing unit 100, a light energy utilization unit 200 and a reflection groove 300. The liquid light-condensing unit 100 and the reflection groove 300 in this embodiment are both uniaxial symmetric strip structures, with the cross section thereof being axially symmetric relative to the symmetrical axis.

The transparent wall may include a transparent top wall 110 and a transparent bottom wall 120. The light energy utilization unit may be arranged in the accommodating cavity, and the first light energy utilization part 210 may be attached to the inner side of the transparent top wall 110 for receiving incident sunlight from the transparent top wall 110. There is a transparent liquid 130 arranged between the second light energy utilization part 220 and the transparent bottom wall 120 for guiding sunlight onto the second light energy utilization part 220. For example, as much sunlight as possible may be directed to the second light energy utilization part 220 through the total reflection phenomenon.

Furthermore, the solar energy utilization apparatus may include a closed container 400 inside which the light energy utilization unit 200 and the liquid light-condensing unit 100 are arranged. The closed container 400 may have a transparent surface, allowing sunlight to be transmitted therefrom into the liquid light-condensing unit 100. The transparent surface may be a top surface or other sides of the closed container 400. A working medium 420 may be arranged in the closed container 400 for being in contact with the light energy utilization unit 200 and/or the reflection groove 300. The closed container 400 may have a first external interface 410 for allowing the working medium to enter or exit the closed container 400 to utilize the working medium.

Specifically, referring to FIG. 4, in a more specific embodiment, the closed container 400 is arranged below the reflection groove 300 and is in thermal contact with the liquid light-condensing unit 100 and/or the reflection groove 300. A portion of the surface of the closed container 400, such as the top surface, may overlap or share with a portion of the surface of the liquid light-condensing unit 100 or the reflection groove 300 for sunlight entry. The closed container 400 may be provide with a working medium 420 and a first external interface 410 for heat exchange with an external heat utilization device.

In this embodiment, in order to facilitate heat exchange between the transparent liquid 130 of a liquid transparent lens and the working medium in the closed container 400, the middle portion of the transparent bottom wall 120 is inverted V-shaped and coincides with the protruding light reflecting structure 310 on the reflection groove 300, and this portion is immersed in the working medium in the closed container 400.

The above specific examples are set forth to aid in understanding the present disclosure and are not intended to limit the present disclosure. Variations of those specific embodiments may become apparent to those skilled in the art in light of the teachings herein.

The invention claimed is:

1. A solar energy utilization apparatus, comprising:
   a light energy utilization unit having a first light energy utilization part and a second light energy utilization part that are capable of receiving, converting and utilizing solar light, the first light energy utilization part and the second light energy utilization part being arranged back to back;
   a liquid light-condensing unit in an axially symmetric structure or a rotating structure, the liquid light-condensing unit having an accommodating cavity filled with a transparent liquid and provided with a transparent top wall and a transparent bottom wall,
   the transparent top wall being a light receiving surface for receiving sunlight from outside, the width of the light receiving surface being greater than the width of the first light energy utilization part and/or the second light energy utilization part; and
   a reflection groove with a reflecting surface arranged on an inner wall thereof, the liquid light-condensing unit being arranged in the reflection groove with at least partially the transparent bottom wall being apart from a bottom wall of the reflection groove, the second light energy utilization part being arranged towards the reflecting surface, such that a part of the sunlight is allowed to be transmitted from the liquid light-condensing unit onto the reflecting surface and, by means of the reflecting surface, reflected back into the liquid light-condensing unit or reflected onto the light energy utilization unit, and a part of the sunlight in the accommodating cavity transmitted from the transparent liquid to the transparent top or bottom wall forms a total reflection phenomenon to concentrate the sunlight onto the light energy utilization unit;
   wherein the first light energy utilization part is arranged at an outer side of the transparent bottom wall, the transparent liquid guides the sunlight onto the first light energy utilization part, and the reflecting surface is capable of reflecting at least part of the sunlight onto the second light energy utilization part.

2. The solar energy utilization apparatus according to claim 1, wherein at least a portion of the reflecting surface is a reflective Fresnel lens.

3. The solar energy utilization apparatus according to claim 1, wherein a bottom of the reflection groove has a light reflecting structure protruding towards the liquid light-condensing unit.

4. The solar energy utilization apparatus according to claim 1, further comprises a closed container, wherein the light energy utilization unit and the liquid light-condensing unit are arranged in the closed container, the closed container has a transparent surface so that the sunlight is allowed to be transmitted from the transparent surface into the liquid light-condensing unit; the closed container is provided with a working medium in contact with the light energy utilization unit; and the closed container has a first external interface for the working medium to enter and exit the closed container to utilize the working medium.

5. The solar energy utilization apparatus according to claim 1, further comprising a mounting member coupled to the liquid light-condensing unit and/or the reflection groove and configured to connect the solar energy utilization apparatus with another adjacent solar energy utilization apparatus.

6. The solar energy utilization apparatus according to claim 1, wherein the transparent top wall or the transparent bottom wall is a flat surface, a curved surface, a folded surface or a Fresnel lens tooth surface.

7. The solar energy utilization apparatus according to claim 1, wherein the transparent bottom wall has a V-shaped structure or an inverted V-shaped structure.

8. The solar energy utilization apparatus according to claim 1, wherein the reflecting surface is arranged separately from the transparent bottom wall.

9. The solar energy utilization apparatus according to claim 1, wherein a portion of the transparent bottom wall is overlapped with a portion of the reflecting surface.

* * * * *